United States Patent [19]

Wragg

[11] 3,830,515
[45] Aug. 20, 1974

[54] VEHICLE SUSPENSION SYSTEMS
[75] Inventor: Ronald Wragg, Sheffield, England
[73] Assignee: North Derbyshire Engineering Co., Ltd., Sheffield, England
[22] Filed: Mar. 12, 1973
[21] Appl. No.: 340,537

[52] U.S. Cl............................ 280/104.5 R, 280/104
[51] Int. Cl................................................ B60g 5/06
[58] Field of Search...................... 280/104, 104.5 R

[56] References Cited
UNITED STATES PATENTS

| 2,802,662 | 8/1957 | Hirst | 267/63 A |
| 3,204,977 | 9/1965 | Eisenhauer | 280/104.5 R |
| 3,502,345 | 3/1970 | Hulverson | 280/104.5 R |
| 3,528,680 | 9/1970 | Nelson | 280/104.5 R |

FOREIGN PATENTS OR APPLICATIONS

| 291,844 | 6/1928 | Great Britain | 280/104 |

Primary Examiner—Philip Goodman
Attorney, Agent, or Firm—Lowe, King and Price

[57] ABSTRACT

A suspension system for trailer vehicles comprises two cradles in each of which a wheel supporting axle is resiliently mounted, the cradles being in end-to-end relationship along the length of the vehicle, the forward end of the leading cradle and the rearward end of the trailing cradle being pivotally secured to the vehicle, and the adjacent ends of the cradles being pivotally secured to each other in such a manner that movement of one cradle about its pivot to the vehicle causes an equal and opposite movement of the adjacent cradle about its pivot to the vehicle.

7 Claims, 1 Drawing Figure

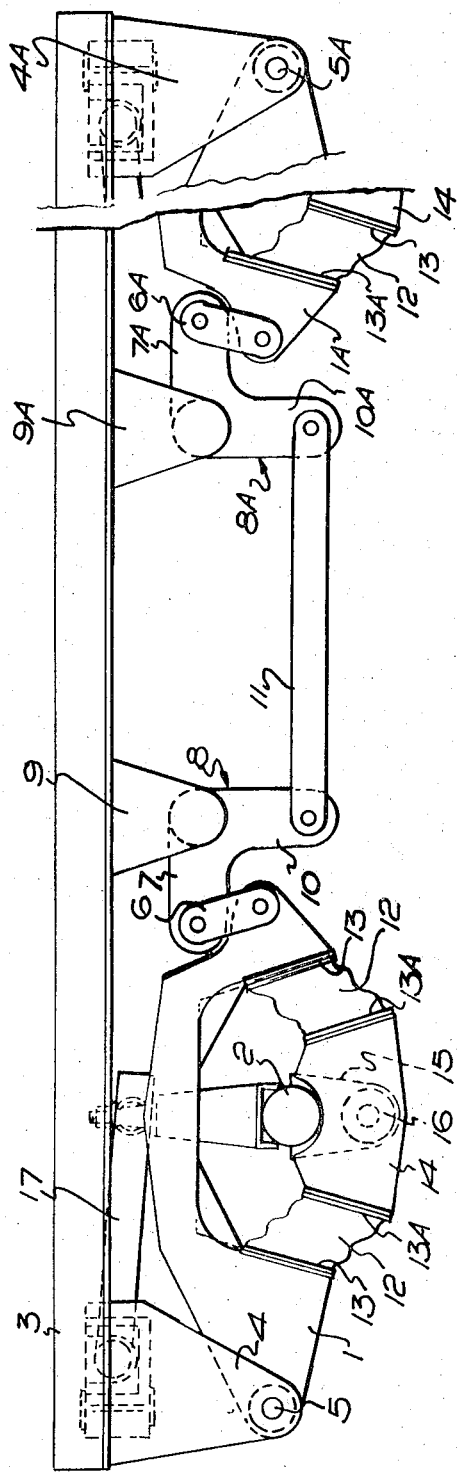

VEHICLE SUSPENSION SYSTEMS

This invention relates to vehicle suspension systems and is particularly related to suspension systems applied to the trailers of trailer vehicles.

For a variety of commercial reasons there is an ever increasing demand for vehicles capable of accepting bigger and bigger loads. In order that the vehicle can accept large loads it has been necessary to produce load carrying trailers of relatively great lengths which has inevitably caused the wheel supporting axles of such trailers to be widespread. Current legislation is such that trailers must be designed in a manner whereby the loading applied to each axle remains substantially constant, and this has led to the development of systems of widespread axle trailers in which there has been an inter-linking of the axles in an endeavour to maintain constant loading.

In any system of inter-linked widespread axle it must be the case that there is a limit to which one axle can move vertically with respect to the axle to which it is linked before the system goes solid, at which point any continued vertical movement causes the other axle to lift. Thus, if an obstruction is met by the wheels of the first axle of a size greater than the maximum amount that that axle is capable of moving, the wheels on the other axle are caused to lift. Once this has happened the loading per axle has been altered drastically and in a two-axle system the entire load is placed on the first axle.

The object of the present invention is to provide a suspension system for trailer vehicles having widespread inter-linked axles that permits far greater movement of one axle with respect to its inter-linked axle before the second axle is caused to lift.

According to the present invention a suspension system for trailer vehicles comprises two cradles in each of which a wheel supporting axle is resiliently mounted, the cradles being in end-to-end relationship along the length of the vehicle, the forward end of the leading cradle and the rearward end of the trailing cradle being pivotally secured to the vehicle, and the adjacent ends of the cradles being pivotally secured to each other in such a manner that movement of one cradle about its pivot to the vehicle causes an equal and opposite movement of the adjacent cradle about its pivot to the vehicle. With an extremely long vehicle, more than one pair of cradles may be provided, each pair being connected together and to the vehicle as above defined.

Preferably, the means interconnecting the cradles of the or each pair is formed by a link pivotally secured to the rearward end of the leading cradle, which link is pivotally secured at its other end to one end of a generally horizontal arm of a cranked lever itself pivotally secured to the trailer, there being pivotally secured to the end of the other generally downwardly extending arm of the cranked lever a connecting rod extending to the corresponding arm of a second oppositely directed cranked lever also pivotally secured to the vehicle, the second cranked lever being connected to the forward end of the trailing cradle through a second link pivotally secured to the generally horizontal arm of the second cranked lever and to the cradle.

Thus, the wheels on the first axle meet an obstruction, the tendency for the wheels to lift will first be absorbed by the resilience of the means supporting the axle in the cradle following which the axle will continue to lift and cause the cradle to pivot upwardly about its fixed pivot point. Such movement causes the link at the other end of that cradle to cause pivoting of the cranked lever. This in turn draws the rod connecting the two cranked levers towards the first cradle with a consequent pivoting of the second cranked lever about its fixed pivot in the opposite direction to the first cranked lever. Such movement of the second cranked lever is transmitted through the link connecting it to the second cradle itself to cause the second cradle to pivot in the opposite direction to the first cradle. As a result of this there is permitted a relative movement between the first and second axles of a far greater extent than has been possible. Obviously if instead of meeting an obstruction, the wheels on the first axle meet a depression then the pivotal movement referred to above would be of the opposite direction but with the same result.

It is preferred to give the whole system added resilience by providing each pivot point with a rubber bush.

If required conventional leaf spring means can be utilised to support each axle in each cradle, but it is preferred to employ so-called rubber springs.

According to a further feature of the invention, the axles are resiliently supported in each cradle by springs, the springs being indirectly secured to the axle by a centre-box itself pivotally secured to the axle. Preferably the connection between the axle and the centrebox is via a rubber bush.

In prior constructions, where the axle is connected directly to the springs, any braking, moderate or otherwise has the effect of attempting to turn the axle about its longitudinal centre, with the result that the springs are stressed in a manner that they are not designed to withstand. With rubber springs, a bending moment is applied which in severe conditions can cause tearing of the spring, and with conventional taper leaf springs the applied bending moments, again in severe conditions, can cause fracture of the leafs. Even in moderate conditions, the springs are unduly stressed, and repeated stressing can lead to collapse. More than this, the effect of stressing the springs during braking is such that the axle whilst being positively connected to the springs is not positively held against turning over. This causes the wheels to bounce or hop on the road surface with a consequent loss of braking power and increased tyre wear. This characteristic becomes more pronounced in prior constructions of widespread axle arrangements, when the spring reaction caused by one axle is transmitted to the springs of the other axle. By adopting the construction of the invention, any turning effect on the axle cannot be transmitted to the springs because of the pivotal connection to the centre-box. Thus the springs of one cradle are not required to take loadings for which they are not designed, nor are they unnecessarily stressed. Also, in the widespread axle assembly, any turning moment of one axle is not transmitted to its cradle, and hence cannot be transmitted to the interconnected cradle. To prevent the axle from turning completely over during braking, it is necessary to connect the axle to the sub-frame of the vehicle through a triangular torque arm, which accepts both longitudinal and transverse torque, thereby assisting in relieving the springs of all abnormal loadings during braking.

One embodiment of the invention will now be described, by way of example, with reference to the accompanying drawing which shows two cradles secured to a vehicle frame and to each other in accordance with the invention. In the drawing, a cradle 1 supporting an axle 2 which in turn supports road wheels (not shown) is pivotally mounted on a vehicle frame 3 by a support member 4 having a pivotal connection 5 to the cradle. At the opposite end of the cradle to the pivotal connection 5 a link 6 is provided pivotally secured at one end to the cradle, the other end of the link 6 being pivotally secured to a generally horizontal arm 7 of a cranked lever 8, that cranked lever itself being pivotally mounted on a support member 9 secured to the vehicle frame. The cranked lever has a second generally downwardly extending arm 10 to the end of which is pivotally secured a generally horizontal connecting rod 11, the opposite end of which is pivotally secured to the generally downwardly extending arm 10A of a second cranked lever 8A, that cranked lever also being pivotally secured to the frame by a support 9A. The generally horizontal arm 7A of the lever 8A is secured to a second cradle 1 (also supporting an axle) by a link 6A pivotally secured at one end to the horizontal arm 7A and at its other end to one end of the cradle 1A. The other end of the cradle 1A is pivotally secured to the vehicle frame 3 by a support 4A having a pivotal connection 5A to the cradle 1A.

At least the pivotal connections 5 and 5A include a rubber bush, and it is preferred to provide a rubber bush at each pivot point betwen the links, the cranked levers and the horizontal arm to give the whole system added resilience.

Two identical cradles, one of which is reversed with respect to the other, are therefore pivotally secured by their outermost ends to the vehicle frame 3 and secured to each other at their innermost ends in a manner which will cause opposite movement of the cradles in the vertical direction as will now be described.

Thus, if the wheels on the axle 2 meet an obstruction the axle 2 will be lifted with consequent pivoting of the cradle 1 about its pivot 5. At the same time the system of cranked levers 8, 8A links 6, 6A and connecting rod 11 are caused by the pivots on the supports 9 and 9A to effect opposite movement of the innermost ends of the cradle. As the axle 2 lifts then so will the innermost end of the cradle 1 causing the cranked lever 8 to pivot in a clockwise direction. This draws the connecting rod 11 to the left and thereby causes similar clockwise movement of the cranked lever 8A thereby causing the cradle 1A to pivot about its pivot 5A in the opposite direction to the pivot of the cradle 1. This has the result that there is a permitted relative movement in the vertical direction between the two axles that is far greater than has hitherto been possible. Simiarly, if the foremost wheels on the axle 2 hit a depression in the road surface, the pivotal movement described above will again be effected but will be of the opposite direction.

Each axle 2 is supported in its cradle by a socalled rubber suspension system. Thus each cradle 1 is provided with a pair of oppositely inclined rubber springs 12, each rubber spring being bonded between a pair of support plates 13, 13A. Each plate 13 is rigidly secured to an appropriately inclined face on the cradle and each plate 13A to an appropriately inclined face on a centre-box 14, the centre-box being pivotally secured to the axle by a support member 15, the connection between the centre-box and the support member including a rubber bush 16. Thus, any turning effect on the axle cannot be transmitted to the rubber springs because of the pivotal connection of the centre-box and, accordingly, the springs of one cradle are not required to take loads such as are caused by bending moments, for which they are not designed, nor are they unnecessarily stressed. In addition to this any turning moment imparted to one axle cannot be transmitted to the other cradle and the axle in that other cradle. It is necessary in a rubber spring system to prevent the axle from turning over completely and, accordingly, a torque arm 17 is provided connecting the axle to the frame 3 which torque arm accepts both longitudinal and transverse torque and thereby assists in relieving the rubber springs of all abnormal loadings during excessive braking or acceleration of the vehicle.

What I claim is:

1. A suspension system for trailer vehicles comprising two rigid cradles, spring means mounted in each of said cradles for resiliently supporting a wheel supporting axle, the cradles being in end-to-end relationship along the length of the vehicle, the forward end of the leading cradle and the rearward end of the trailing cradle being pivotally secured to the vehicle, and the adjacent ends of the cradles being pivotally secured to each other through connecting rod and lever means in such a manner that movement of one cradle about its pivot to the vehicle causes an equal and opposite movement of the adjacent cradle about its pivot to the vehicle, whereby a vertical relative movement of said axles which is isolated with respect to a loading of said spring means is provided.

2. A suspension system as in claim 1, wherein said connecting rod and lever means includes a link pivotally secured to the rearward end of the leading cradle, which link is pivotally secured at its other end to one end of a generally horizontal arm of a cranked lever itself pivotally secured to the vehicle, there being pivotally secured to the end of the other generally downwardly extending arm of the cranked lever a connecting rod extending to the corresponding arm of a second oppositely directed cranked lever also pivotally secured to the vehicle, the second cranked lever being connected to the forward end of the trailing cradle through a second link pivotally secured to the generally horizontal arm of the second cranked lever and to the cradle.

3. A suspension system as in claim 1, wherein each pivot point is provided with a rubber bush.

4. A suspension system as in claim 1, wherein each axle is supported in its cradle by so-called rubber springs.

5. A suspension system as in claim 1, wherein in each cradle the resilient mounting for the axle is springs, which springs are indirectly secured to the axle by a centre-box itself pivotally secured to the axle.

6. A suspension system as in claim 5, wherein the connection between the axle and the centre-box is via a rubber bush.

7. A suspension system as in claim 1, wherein the axle in each cradle is connected to a sub-frame of the vehicle by a torque arm which torque arm accepts both longitudinal and transverse torque.

* * * * *